United States Patent
Pijnenburg et al.

(10) Patent No.: US 8,212,518 B2
(45) Date of Patent: Jul. 3, 2012

(54) METHOD OF CONTROLLING A POWER TRANSFER SYSTEM AND POWER TRANSFER SYSTEM

(75) Inventors: Remco H. W. Pijnenburg, Hoogeloon (NL); Bruno Motte, Benouville (FR); Peter C. S. Scholtens, Nijmegen (NL)

(73) Assignee: NXP B.V., Eindhoven (NL)

( * ) Notice: Subject to any disclaimer, the term of this patent is extended or adjusted under 35 U.S.C. 154(b) by 279 days.

(21) Appl. No.: 12/682,721

(22) PCT Filed: Oct. 10, 2008

(86) PCT No.: PCT/IB2008/054173
§ 371 (c)(1),
(2), (4) Date: Apr. 12, 2010

(87) PCT Pub. No.: WO2009/050624
PCT Pub. Date: Apr. 23, 2009

(65) Prior Publication Data
US 2010/0207575 A1 Aug. 19, 2010

(30) Foreign Application Priority Data

Oct. 15, 2007 (EP) .................................. 07291254

(51) Int. Cl.
*H01M 10/44* (2006.01)
*H01M 10/46* (2006.01)
(52) U.S. Cl. ...................................................... 320/108
(58) Field of Classification Search .................. 320/106, 320/107, 108, 109, 132
See application file for complete search history.

(56) References Cited

U.S. PATENT DOCUMENTS

| 2003/0085621 | A1* | 5/2003 | Potega ........................... 307/18 |
| 2003/0214821 | A1 | 11/2003 | Giannopoulos et al. |
| 2005/0121523 | A1* | 6/2005 | Schmidt et al. .......... 235/462.46 |
| 2006/0145660 | A1 | 7/2006 | Black et al. |
| 2007/0182367 | A1 | 8/2007 | Partovi |
| 2010/0207575 | A1* | 8/2010 | Pijnenburg et al. ........... 320/108 |

FOREIGN PATENT DOCUMENTS

| DE | 10 2004 039651 A1 | 3/2006 |
| GB | 2 394 843 A | 5/2004 |
| GB | 2 422 517 A | 7/2006 |
| WO | 03/105308 A1 | 12/2003 |
| WO | 2006/085246 A1 | 6/2006 |
| WO | 2007/122439 A | 11/2007 |

OTHER PUBLICATIONS

Heringa, A., et al; "Novel Power Transistor Design for a Process Independent High Voltage Option in Standard CMOS"; Proceedings of the 16th Intl Symposium on Power Semiconductor Devices & IC's; Naples, IT; (Jun. 2006).

* cited by examiner

Primary Examiner — Edward Tso

(57) ABSTRACT

A power transfer system has a power transfer device including least one portable device and a method of controlling the power transfer system specifically in case of a dead battery condition of a battery of the portable device. The power transfer device for wirelessly charging of the battery arranged in the portable device and the power transfer device each has a near field communication functionality for data communication by a data communication link between the devices. The method includes a step of starting to establish the data communication link between the devices.

10 Claims, 3 Drawing Sheets

METHOD OF CONTROLLING A POWER TRANSFER SYSTEM AND POWER TRANSFER SYSTEM

FIELD OF THE INVENTION

The present invention relates to a method of controlling a power transfer system for transferring electric power from a power supply device to a portable device, and to the power transfer system.

BACKGROUND OF THE INVENTION

Portable devices, and in particular electronic equipment, such as mobile phones or small hand-held computers, any mobile and wireless devices include secondary power cells for power supply which are usually provided in the form of rechargeable power cells (rechargeable batteries) saving the user the costs and the inconvenience of regularly having to purchase new (not rechargeable) cells. Rechargeable cells are preferred due to economical and environmental reasons.

A charging operation of the rechargeable cells can be performed by using an adaptor or charger which takes power from a public electrical power network (mains power supply) or other adequate sources of power. The adaptor or charger connected to the mains power supply is further connected by a supply line and a suitable connector to the portable device, and charging starts immediately upon physically connecting the devices. When the charging operation is completed, this is usually displayed on the display means of the portable device, and charging may be stopped or reduced.

Conventional adaptors or chargers exhibit a number of problems when used for recharging secondary cells of any arbitrary portable device.

The adaptors and chargers usually require the users to plug a connector into the device, and the devices should better not be used in wet environment due to the possibility of corroding or shorting out the contacts, and also such devices cannot be used in flammable gaseous environment due to the possibility of creating electrical sparks.

The problems above can be solved by replacing the conventional chargers or adaptors by inductive chargers for transmitting the electric energy for charging the batteries of a device by means of an electromagnetic field and a direct magnetic coupling without a physical electrical connection, i.e. without using plug and socket. Since the inductive chargers for wireless charging remove the need to have open electrical contacts in conjunction with a cable connection it is possible to use such chargers in wet or dusty environments since both the chargers and the device to be charged can be provided as sealed devices without physical contacts being exposed to the outside. The basical principle of such inductive chargers involves magnetic cores with a coil wound around the cores, and a generated magnetic field penetrating through the air gap or a region of non-magnetic material between the devices and forming a magnetic inductive link for power transmission.

The arrangements as mentioned above, however, lead to a non-uniform flux distribution of the magnetic field so that the charging effectivity is largely dependent from the correct placement of the portable device on the inductive charger.

According to further developments there is provided a planar inductive battery charger, an example of which is disclosed in prior art document WO 03/105308 A1. On a charging surface of a planar charging module is at least one planar coil or a plurality of planar coils arranged to generate a planar magnetic field. By means of this planar magnetic field an inductive coupling to a device placed thereon is established when this device (a portable device such as a mobile phone) is also equipped with a corresponding magnetic coil. The battery included in the portable device can be charged when the portable device is placed on the planar surface of the charging module and the magnetic field of the charging module is coupled to the coil of the portable device. That is, when the portable device is placed on the charging module which constitutes a docking station with integrated inductive link for power transfer, this also poses several other problems.

For almost every portable device there is the need of having a different docking station, since the shape of the devices may vary considerably from device to device and manufacturer to manufacturer, and the users need to have several different docking stations for different devices in use. Moreover, every docking station or every charging module needs to be plugged into sockets of a mains power supply, and when several docking stations are used together, they take up space in plug strips and create a messy and confusing tangle of wires.

In many cases portable or mobile devices to be charged must be placed into a stand, usually one device per one docking station, causing inconvenience for the user. In other cases the device position or the orientation thereof is pre-defined for proper and optimized charging. This sets limitations for the user interface of the device (position on the desk, horizontal and axial viewing angle to the display means of the device).

To overcome such limitations of inductive power transfer systems, which require that secondary devices need to be placed on predefined positions on the charging module thereof, power transfer pads have been developed, these pads generating an electromagnetic field over a large area, and preferably the whole pad area. The user can simply place one or more devices the batteries of which are to be charged on the pad with no requirement to place them accurately or at a predetermined position.

In the above-described planar charging module of document WO 03/105308 A1 an array of planar coils is provided and only coils which are needed are activated. The electromagnetic field generated is close to the pad and only around the position where the portable device is placed. The relative location of the portable device on the planar charging module can be sensed and a control unit can then activate the appropriate coils to deliver power to these coils which in turn deliver power via the magnetic field to the portable device.

Specifically, when the portable device is used in an extensive manner and the battery thereof is completely exhausted or when the battery is damaged and cannot provide any suitable power to power-up the portable device, it is necessary to charge the battery power source of the portable device in an appropriate manner. It may also occur that the battery is not correctly mounted to the portable device and cannot power the portable device. When the portable device suffers from such a "dead battery condition" or a corresponding malfunction it is difficult to charge the battery power source of such a portable device as the correct or optimized charging power cannot be determined when the portable device suffering from the dead battery condition is placed on the charging module (charging pad) of a power transfer device.

SUMMARY OF THE INVENTION

It is therefore an object of the present invention, to provide a method of controlling a power transfer device as well as the power transfer device which ensures optimized charging operation even if a portable device suffers from a completely exhausted or dead battery power source.

According to the present invention, this object is accomplished by a method of controlling a power transfer system as well as by the power transfer system as put forward in the appended claims.

The power transfer system of the present invention comprises a power transfer device as well as at least one portable device. The power transfer system which serves for wireless charging of a battery power source arranged in the portable device, as well as the power transfer device each comprise a near field communication functionality for data communication by a communication link between the power transfer device and the portable device. The near field functionality allows the establishment of the data communication link based on the near field communication.

The control concept of the method of controlling the power transfer system includes a step of starting to establish the data communication link between the power transfer device and the portable device. When starting of the establishment of the data communication link is performed, the power transfer device requests that the portable device may transmit an identification information via the data communication link to the power transfer device. In conjunction with this request to have an identification information it is detected whether the identification information of the portable device is received by the power transfer device or not. Depending upon whether the identification information is received a setting is performed in a further step, setting a charging power to be transferred from the power transfer device to the portable device. The setting provides a charging power not exceeding a first predetermined value when the identification information is not received by the power transfer device. Depending upon this setting a power transfer link is established by the power transfer device, and the charging power set before, that is, the charging power not exceeding the first predetermined value, is transferred to the portable device so that the portable device can be powered by this transferred power and the battery power source thereof can be charged.

The portable device can be powered by this power transferred by the power transfer device to the portable device even when the battery power source of the portable device is totally exhausted (dead battery condition) or when the battery power source is not mounted properly to power the portable device. In this case the power supplied by the power transfer device is sufficient to power up the portable device by the magnetic coupling so that at least a data communication can be carried out by means of the data communication link between the portable device and the power transfer device even under dead battery condition.

The power transfer device of the power transfer system includes a controller which serves for establishing the data communication link between the power transfer device and the portable device, for specifically requesting the portable device to transmit an identification information via the data communication link, and includes a detection means for detecting whether the identification information has been received, as well as a setting means for providing a setting of the power to be transferred to the portable device depending upon the detection result. An establishing means establishes, depending upon the detection result and the setting result, a power transfer link between the power transfer device and the portable device to in an optimized manner transfer an adequate charging power (according to a predetermined strength) to the portable device.

Regarding the above-stated method of controlling the power transfer system, the starting step includes starting the establishment of the data communication link on the basis of a near field communication (NFC). Moreover, the determining step includes the step of judging whether any data are received from the portable device via the data communication link, and whether any such information received represents an identification information of said portable device.

The setting step further includes the setting of the charging power to a value in a range from the first predetermined value to a second predetermined value which is higher than the first predetermined value, when the detecting step reveals that the identification information is received.

The establishing step further includes the generation of a magnetic field by at least one coil in the power supply device according to a strength corresponding to the charging power not exceeding the first predetermined value, when the identification information is not received, and according to a strength corresponding to a range from the first predetermined value to a second predetermined value, when the identification information is received as detected in the detecting step.

In the power transfer system the establishing means includes at least one of first coils connected to the first controller of the power transfer device as well as a second controller connected to a second coil of the portable device to generate a magnetic field to establish one of the data communication link and the power transfer link between the power transfer device and the portable device. The first controller comprises an NFC circuit and the second controller comprises an NFC circuit for establishing the communication link on the basis of the near field communication (NFC).

These and other aspects of the invention will be apparent from and elucidated with reference to the embodiments described hereinafter.

DETAILED DESCRIPTION OF EMBODIMENTS

Figure 1:
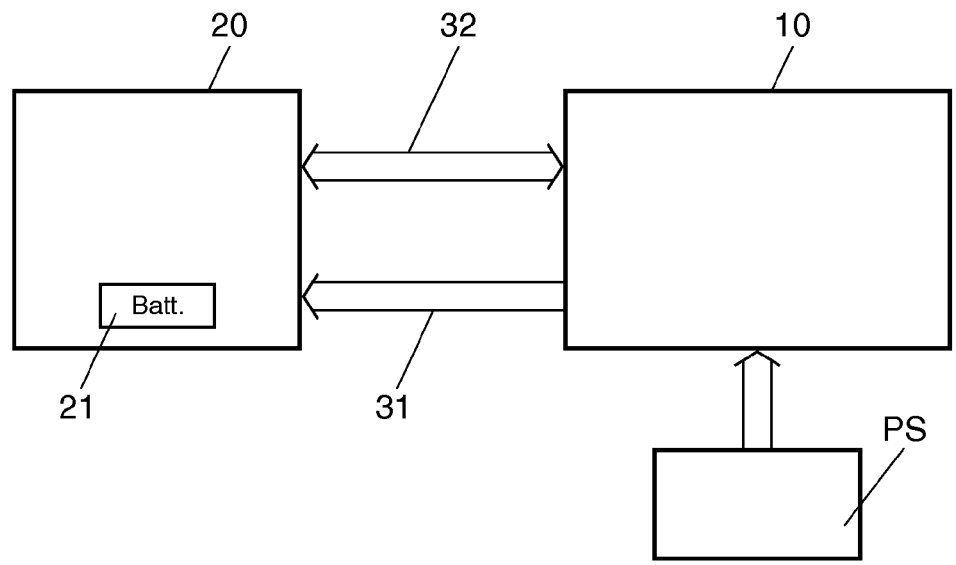
FIG. 1 shows the basical concept of the present invention in the form of a schematic diagram.
Figure 2:
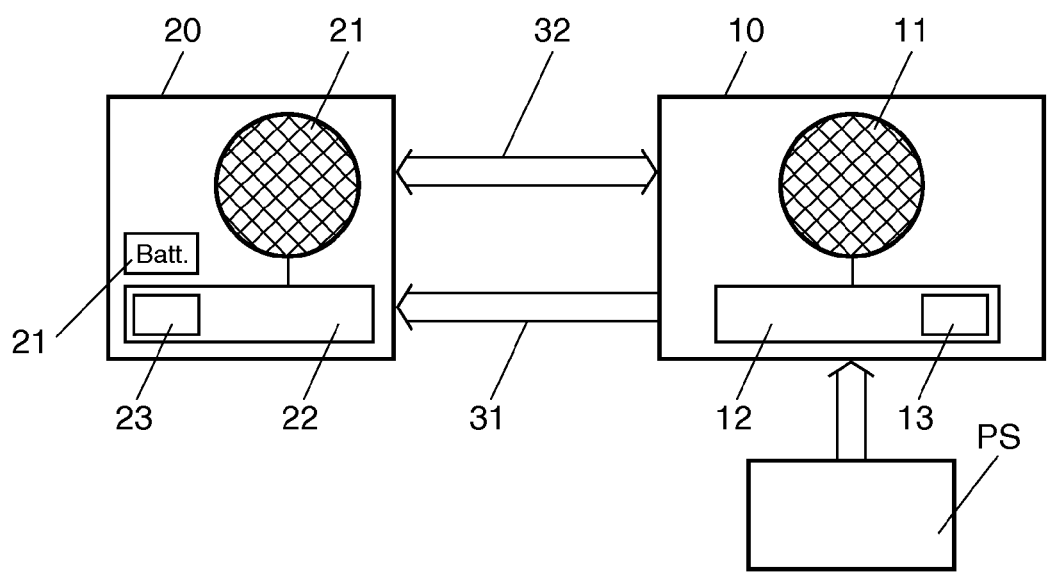
FIG. 2 shows an embodiment of the present invention with more details of the power transfer device and the portable device shown in FIG. 1.
Figure 3:
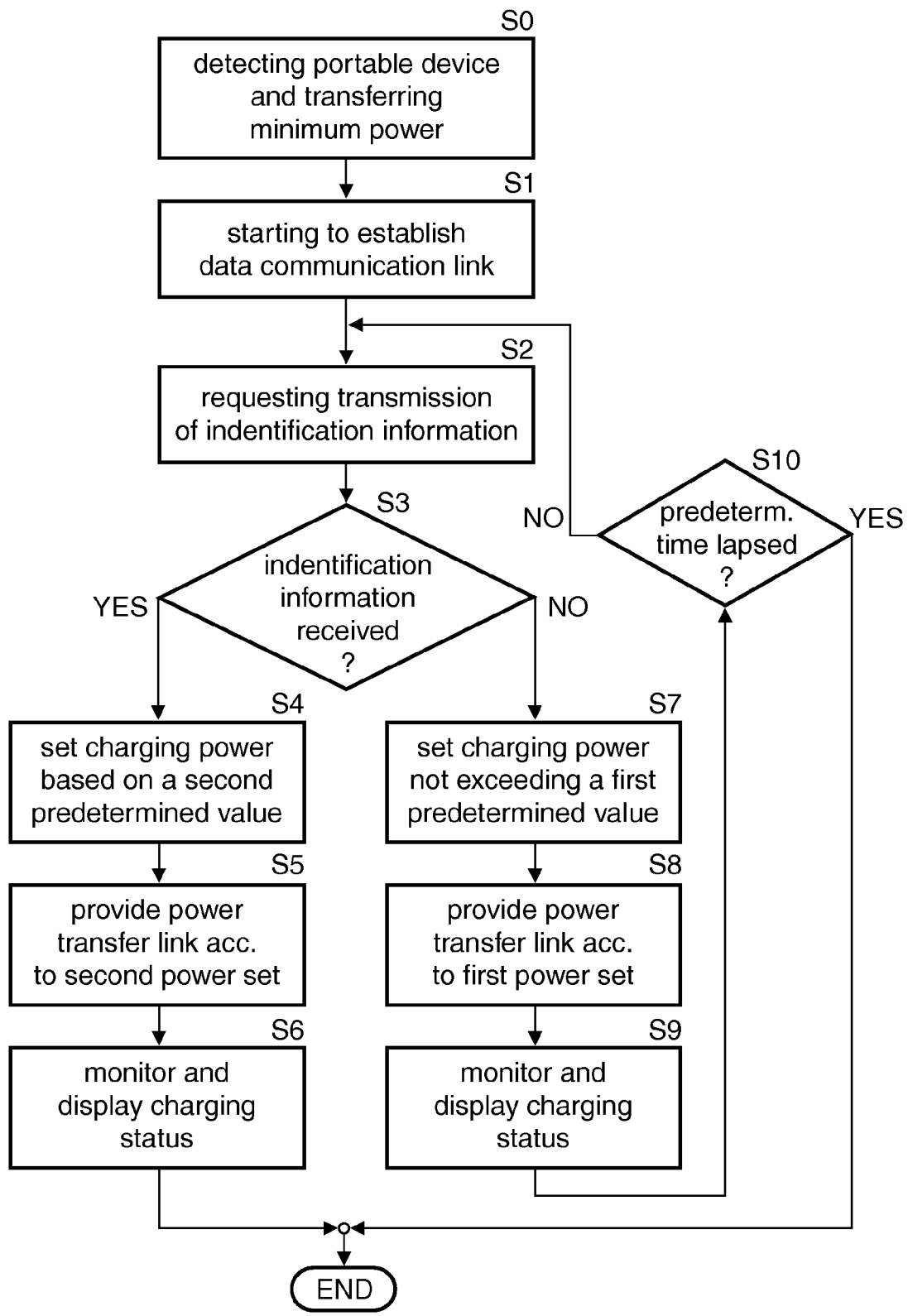
FIG. 3 shows a flow chart of a data communication process carried out in conjunction with establishment of a data communication link.

A first embodiment of the method of controlling the power transfer system as well as of the power transfer system according to the present invention is now described in detail in conjunction with FIGS. 1 to 3.

FIG. 1 shows the basic arrangement of the power transfer system of the present invention in the form of a schematic diagram in which a power transfer device 10 is provided as a charging device (charging pad) for a portable device 20. The at least one portable device 20 includes a rechargeable battery (rechargeable cell) as the battery power source 21 thereof which is recharged by a power delivered from or transferred by the power transfer device 10. The portable device 20 which includes the battery power source 21 is powered by this rechargeable battery.

The power transfer device 10 receives from a mains power supply network PS which is usually provided in the form of a public power supply network power for its own operation and for transferring a suitable power to the portable device 20.

When the power transfer device 10 is connected to the mains power supply PS, the power transfer device 10 is able to supply this electric power to the portable device 20 for charging the rechargeable battery in the form of battery power source 21 of the portable device 20 and to render data communication between the devices possible.

In general, the portable device 20 must be located very close to the power transfer device 10 or must preferably be placed on the power transfer device 10 for optimized power transfer. This is the precondition for obtaining a magnetic or inductive coupling between the power transfer device 10 and the portable device 20. To this end, the power transfer device 10 is usually provided in the form of an inductive power transfer pad having a flat (planar) surface where at least one portable device 20 can be placed. This ensures a close arrangement of the portable device on the power transfer device 10.

A is shown in FIG. 1 and indicated by respective arrows between the representation of the power transfer device 10 and the portable device 20, a communication data link 32, besides a power transfer link 31, is established between the power transfer device 10 and the portable device 20 and is based on the principles of near field communication NFC.

In addition to the basic structure of the power transfer system according to the present invention as is shown in FIG. 1, the arrangement shown in FIG. 2 which is based on the structure shown in FIG. 1 presents further details of the structure of each of the power transfer device 10 and the portable device 20.

The power transfer device 10 and the portable device 20 have a magnetic coupling (inductive coupling) for establishing the power transfer link 31 which serves for supplying power to the portable device 20 for charging the battery power source 21 thereof. This magnetic coupling also forms the basis for the data communication link 32 based on the near field communication NFC.

The power transfer device 10 basically provided as a planar power transfer device (charging pad), has a coil arrangement as is shown in FIG. 2 comprising at least one of first coils 11. The at least one first coils 11 constitutes a coil arrangement of the power transfer device 10 and serves for generating an electromagnetic field to establish the data communication link 32 or the power transfer link 31 (for charging the battery power source 21 of the portable device 20) as is shown in FIG. 2. In the following the electromagnetic field for an inductive coupling is simply referred to as a magnetic field.

The power transfer device 10 further comprises a first controller 12 which is arranged for driving, in a controlled manner, the at least one of first coils 11 of the coil arrangement of the power transfer device 10 for generating or receiving the respective magnetic field for an inductive coupling to the portable device 20 for establishing the data communication link 32 or the power transfer link 31.

In more details, the first controller 12 comprises a first NFC circuit 13 which serves for driving the at least one of first coils 11 of the coil arrangement of the power transfer device 10 specifically for establishing the data communication link 32 based on near field communication NFC. The incorporation of the first NFC circuit 13 in the first controller 12 represents the NFC functionality of the power transfer device 10 and also constitutes an NFC receiver or transmitter. For the operation of the power transfer device 10 power is drawn from the mains power supply PS. The at least one of first coils 11 serves as an antenna in view of transmitting and receiving the magnetic fields.

In a similar manner the portable device 20 comprises a second controller 22 which receives power from the battery power source 21, and which is further connected to a second coil 21 which also serves for generating a magnetic field for a magnetic coupling to the power transfer device 10, and which therefore constitutes in view of the magnetic field for the inductive coupling the counterpart to the at least one of first coils 11 of the power transfer device 10.

That is, the second coil 21 of the portable device 20 serves for establishing or supporting the power transfer link 31 for receiving power from the power transfer device 10, as well as for establishing or supporting the data communication link 32 based on the near field communication NFC. That is, the second controller 22 of the portable device drives the second coil 21 to establish either the power transfer link 31 or the data communication link 32 between the portable device 20 and the power transfer device 10 due to inductive coupling.

Specifically, for establishing or supporting the data communication link 32 between the portable device 20 and the power transfer device 10 the second controller 22 includes a second NFC circuit 23 which serves for correspondingly driving the second coil 21 to generate or receive a magnetic field from the at least one of first coils 11 of the power transfer device 10 to establish the data communication link 32 on the basis of near field communication NFC.

For establishing the power transfer link 31 or the communication link 32 by means of the structure shown in FIGS. 1 and 2 between the power transfer device 10 and the portable device 20, the portable device 20 must be arranged closely to the power transfer device 10 so that a magnetic field generated by the at least one of first coils 11 (coil arrangement) of the power transfer device 10 can penetrate the second coil 21 of the portable device 20, and a magnetic field generated by the second coil 21 of the portable device 20 can penetrate the at least one of first coil 11 of the power transfer device 10 to obtain the necessary magnetic coupling (inductive coupling).

Specifically, in case the data communication link 32 is to be established or supported between the power transfer device 10 and the portable device 20, both the first NFC circuit 13 arranged in the first controller 12 of the power transfer device 10, as well as the second NFC circuit 23 arranged in the second controller 22 of the portable device 20 are activated to provide in conjunction with the respective controller an appropriate driving of the respective coils to establish or support the data communication link 32 between the power transfer device 10 and the portable device 20 based on near field communication NFC.

Regarding the technology of a near field communication NFC forming the basis for the data communication link 32 between the power transfer device 10 and the portable device 20, both devices need to have the near field communication functionality (NFC functionality) so that a communication link on the basis of the near field communication NFC can be initiated and established.

The near field communication of both the power transfer device 10 and the portable device 20 are represented by the respective NFC circuits (first NFC circuit 13 and second NFC circuit 23) of both devices concerned.

The near field communication NFC in general is a very short-range wireless technology for distances between two devices for which communication is to be provided, measured in centimeters, and is optimized for intuitive, easy and secure communication between plural devices, such as the above power transfer device 10 and the portable device 20, without any configuration to be carried out by the user. The NFC technology therefore provides an automatic configuration and an automatic establishment of the data communication link.

To obtain the data communication link between two devices in question, it is necessary for the user to bring these devices closed together or even to make them touched. The latter situation is effected by placing the portable device on the power transfer device being usually provided in form of a planar charging pad. The near field communication NFC interfaces or circuit arrangements in the particular devices will then automatically connect and configure themselves to form a peer-to-peer network.

Devices to communicate via a data communication link 32 on the basis of the near field communication NFC must therefore be equipped with the circuits and magnetic coils for establishing the data communication link 32, and such NFC circuits and coils can be included, for example, in the wireless mobile communication device (portable device 20) such as mobile phones, PDAs and the like. Confidential data and data with presenting value can be stored in a secure memory area and can always stay in the portable device (mobile unit). The NFC functionality included in general in the portable device, for example in a PDA or a mobile phone also supports a data transmission or data communication which may be encrypted by a secure NFC functionality using a private encryption key stored on the mobile phone. Furthermore, in case an NFC functionality is implemented into a portable device such as any wireless mobile communication device like a mobile phone, further applications can be provided, such as for example a virtual stored transport ticket or an access to any key building, or any further data communication between computers.

The technology of near field communication NFC involves a frequency standard of 13.56 MHz frequency range, and the near field communication is in general used for any radio frequency identification (RFID). The standard of a near field communication NFC is referenced to in prior art document WO 2006/085246 A1.

Referring back to the present invention as shown in FIGS. 1 and 2, both the portable device 20 as well as the power transfer device 10 include the respective coils (the at least one of first coils 11 and the second coil 21) which serve for both establishing the data communication link 32 based on a near field communication, as well as for establishing the power transfer link 31 which serves for transmitting power in a wireless manner from the power transfer device 10 to the portable device 20. Both the data communication link 32 and the power transfer link 31 require the above-mentioned electromagnetic (inductive) coupling which is provided by the respective magnetic coils in both devices concerned, and the magnetic coupling requires an arrangement of both devices close to each other, and preferably that the portable device 20 being placed on a planar or adequate surface on the power transfer device 10. A short distance of the data communication link 32 based on near field communication NFC lies in general between 0 and 0.1 m.

Hence, the at least one of first coils 11 of the power transfer device 10 and the second coil 21 of the portable device 20 are driven in a different and appropriate manner depending upon the kind of link to be established (data communication link 32 or power transfer link 31). The data communication link 32 based on near field communication NFC requires a tuning by the NFC circuits 13 and 23 in conjunction with the respective coils to the frequency range of about 13.56 MHz, whereas a frequency range for the power transmission can for example be about 460 kHz, or may have a range of approximately 430 kHz to approximately 1.8 MHz. Different other channels for data communication (frequency ranges), that is, for establishing a the data communication link 32 may be used depending on the technical conditions.

FIG. 3 shows a flow chart representing the method steps of the control concept of the present invention, i.e. FIG. 3 shows the principles of the steps of controlling the power transfer system when the battery power source 21 of the portable device 20 is to be charged, and specifically when the battery power source 21 is fully exhausted (discharged) or damaged.

When the portable device 20 is located close to or preferably on the power transfer device 10 so that both devices are close to each other and are arranged within both the distance range for data communication (NFC range) and the power transfer range, an automatic starting of establishing the data communication link 32 is carried out. A basic step (initial step) S0 in FIG. 3 indicates the preconditions for establishing the data communication link 32. That is, the power transfer device 10 must manually be operated when a portable device 20 is placed thereon to be able to transfer a minimum power to the portable device 20. When the battery power source 21 of the portable device 20 suffers from energy and is totally exhausted, damaged or not properly mounted to the portable device 20, the portable device 20 cannot be powered up by the battery power source 21, and the necessary data communication link 32 even in this case can be established by means of transferring a minimum power from the power transfer 10 device to the portable device 20 for power-up. Moreover, the presence of the portable device 20 can be sensed automatically without manual operation by the user by sensing the load of the power transfer device (load detection) or by continuous scanning with use of the NFC circuit 23. When the power transfer device 10 is manually operated by the user or when any portable device is sensed on or close to the power transfer device 10 the sequence of steps proceeds to the step of initiating a data communication link.

This is represented by step S1 in FIG. 3, wherein the establishment of the data communication link 32 is started. This step S1 indicates that the data communication link 32 is initiated. Thereafter and in line with step S2 the portable device 20 is powered by a minimum power and then requested by the power transfer device 10 to transmit an identification information to the power transfer device 10. That is, by means of the first NFC circuit 13 in the power transfer device 10 and a respective driving of the at least one of first coils 11 by the first controller 12 to generate a corresponding magnetic field for providing an inductive coupling to the portable device 20 (initiating the data communication link), the request is transmitted via the data communication link 32 based on near field communication NFC (NFC circuit 23) to the portable device 20, and the portable device 20 under operation, i.e. when powered by the battery power source 21 performs a data evaluation by means of the second controller 22 in conjunction with the second NFC circuit 23 of the request transmitted from the power transfer device 10 and sends back the necessary identification information (which is pre-stored in the portable device 20) represented by data which allow identification of the portable device 20 in view of its nature and properties. In this case the first NFC circuit 13 of the power transfer device and the second NFC circuit 23 of the power transfer device 10 function as an NFC transmitters and receivers in conjunction with the respective coils 11 and 21 connected thereto.

After the request transmitted from the power transfer device 10 to the portable device 20 the power transfer device 10 waits for receiving an answer from the portable device 20, this answer representing the identification information as requested.

In case in step S3 of the flow chart of FIG. 3 it is detected that the identification information transmitted from the portable device 20 has been received, i.e. the transmitted data have been received and could be evaluated for retrieving the identification information of the portable device 20 and corresponding information, this represents the detection result YES in step S3, and the flow of the controlled process proceeds to step S4 wherein a charging power is set according to a second predetermined value which is higher than a first predetermined value which is hereinafter described in more detail. Specifically, the charging power can be set depending upon the information continuously or intermittently transmitted by the portable device 20 after establishment of the data communication link 32 and regarding the actual state of charge of the battery power source 21 to a value within the range defined by the first and second predetermined values.

After setting of a charging power according to a second predetermined value in step S4 according to or based on the second value being performed after receipt of the identification information from the portable device 20 in conjunction with the data communication link 32, the power transfer link 31 is now established by a respective driving of the at least one of first coils 11 of the power transfer device 10 by the first controller 12 so that a magnetic field generated in the at least one of first coils 11 penetrates the second coil 21 in the portable device 20, thereby supplying power from the power transfer device 10 to the portable device 20 for recharging of the battery power source 21 thereof.

When according step S5 in the flow chart of FIG. 3 the power transfer device 10 has established the power transfer link 31 according to the second predetermined value, this operating condition of the power transfer device 10 is monitored and displayed on a display means (not shown) of the portable device and/or the power transfer device 10 so that the user has enough information about the current status of the wireless charging of the portable device 20 in question (which is a device-under-charge). Correspondingly, step S6 in FIG. 3 represents the technical measure of monitoring during the charging process the actual state of charge and displaying the charging status when the power transfer link 31 has been established and wireless charging is currently carried out. That is, power transfer by the power transfer device 10 and data communication are carried out simultaneously or intermittently so that the entire charging process can be monitored from the beginning of the charging process until charging of the battery power source 21 of the portable device 20 is completed.

The process as described above represents a power transfer in one-way and a data communication in two-way. By means of the further data transmitted from the portable device 20 to the power transfer device 10 as the data communication there between could be fully established, based on the near field communication NFC, negotiation of the power level (charging power) is done with a two-way protocol (involving the first and the second NFC circuits 13 and 23). As the NFC receiver (first NFC circuit 13) has received suitable information about the portable device 20 and is therefore aware of its vulnerabilities (interference with other communication standards, hardware safety limits, etc.) to certain power levels, typically higher power levels are possible. This corresponds to the range defined by the first and second predetermined value.

Moreover, due to the continuous monitoring of the charging process data are exchanged between the power transfer device 10 and the portable device 20 so that the charging process can be adapted to the actual or varying charging conditions of the battery power source 21 of the portable device 20. This covers the cases where problems occur during charging, for example, when the battery power source 21 becomes too hot and the charging process has to be stopped for a predetermined period of time. The portable device 20 sends a corresponding information to the power transfer device 10 which serves for an adapted control of the charging process. In order to make sure that the power transfer device 10 will not continuously transmit power set between the first and the second predetermined value, that is, a power exceeding the first predetermined value when the portable device 20 cannot or can no longer take the power transferred, the portable device 20 in case of temperature problems of the battery power source 21 sends a corresponding information (feedback signal) to the power transfer device 10 (involving both NFC circuits 13 and 23) before the excessive temperature is reached. Subsequently, the power transfer device 10 can in a timely manner and appropriately control the power transfer level.

It is now again referred back to step S3 wherein it is detected by the power transfer device 10 whether according to the respective request any identification information could be received. There may be the case that the portable device 20, even if located close to and detected by the power transfer device 10 or upon manual operation thereof, is not able to send any identification information due to the fact that the battery power source 21 of the portable device 20 is totally exhausted or damaged and the remaining voltage is below a predetermined threshold which does not allow any proper or reliable operation of the portable device 20. Hence, in case the battery power source is totally exhausted (corresponding to the dead battery condition) or when the battery power source 21 is damaged or not correctly mounted to the portable device 20, the power transfer device 10 cannot receive any information, and in particular no identification information from the portable device 20, and the process proceeds to step S7 when the answer in step S3 whether any identification information is received is NO.

In this connection, the requesting step S2 and the detection step S3 of FIG. 3 may be repeated a predetermined number of times for safely defining that no or no evaluable information has been received. During this operation the power transfer device 10 transfers a minimum power to the portable device 20 to ensure data communication between both devices even under dead battery condition.

Proceeding from step S3 (answer: NO), in the next step S7 a setting is provided of the charging power according to the above-mentioned first predetermined value which is smaller than the second predetermined value used in step S5. In particular, in step S7 of FIG. 3 the charging power which is to be transmitted to the portable device 20 from which no identification information has been received, is determined to provide the portable device 20, the battery power source 21 of which is not able to provide the necessary power. This determination is carried out based on the first predetermined value and serves to provide the portable device 20 with at least a small amount of power (electric energy) which corresponds to the minimum power to operate the portable device 20 as a basis for supporting the data communication link 32 for data exchange between the portable device 20 and the power transfer device 10. The lower power (minimum power) is determined and set not to exceed the first predetermined value.

After the setting of the charging power according to and not exceeding the first predetermined value (step S7) has been made, the power transfer link 31 based on the charging power as set is established so that actually power supply to the portable device 20 with its exhausted battery power source 21 is performed (step S8). In case the battery power source 21 of the portable device 20 is not or not properly mounted, the (minimum) power transferred is sufficient to enable data communication between both devices.

In a similar manner as it is carried out in step S6 when the power transfer link is established according to the second predetermined value (higher power), a monitoring and a display of the charging status is provided (step S9) to inform the user about the operation of the power transfer system, and for specifically informing the user that at least a minimum power which corresponds to the first predetermined value is transferred from the power transfer device 10 to the portable device 20. This is mainly done in the power transfer device 10, or in the portable device 20 when the lower power transferred (not exceeding the first predetermined value) is sufficient therefor.

The minimum power supply according to steps S7 to S9 of FIG. 3 when due to a fully exhausted battery power source 21 the portable device 20 cannot send any identification information to the power transfer device 10, serves for operating the portable device 20 so that data evaluation and data transmission can be carried out, even with a probably reduced performance. Such an operating condition resulting from the dead battery condition allows even with a fully exhausted or damaged battery power source 21 of the portable device 20 access to the portable device 20 and to a predetermined data communication via the data communication link 32 based on near field communication NFC. When steps S7 to S9 of FIG. 3 are carried out a reduced magnetic field is generated in the at least one of first coils 11 of the power transfer device 10, so that the magnetic field generated (inductive coupling) of the at least one of first coils 11 is in its intensity and spatially limited, so that any damage of the portable device 20 (controller 22 or second NFC circuit 23) or the battery power source 21 thereof can effectively be avoided. Even if the battery power source is fully exhausted, damaged or not properly contacted (mounted) to the portable device 20, and even if no identification information about the kind of portable device 20 and its properties could be received by the power transfer device 10, an appropriate power supply to the portable device 20 in the dead battery condition can be ensured, thereby making it possible that even under these disadvantageous operating conditions of the portable device 20 a kind of emergency operation probably with reduced performance can be carried out or maintained. This can be supported by the possibility of providing a manual setting by the user when the user is informed about the present situation (display on the portable device 20 and/or on the power transfer device 10).

The process shown in FIG. 3 comprises a further step S10 which indicates that in the course of the data communication between both devices 10 and 20 upon powering up the portable device 20 with the minimum power not exceeding the first predetermined threshold, the portable device 20 after several attempts of requesting transmission of the identification information from the portable device 20 may eventually send the desired identification information to the power transfer device 10 when enough power has been stored, so that the control of the power to be transferred returns from the branch "NO" from step S3 in FIG. 3 to the branch "YES" from step S3 and, thus, to the normal charging process with power exceeding the first predetermined value based on further data communication. To this end, the process proceeds from step S9 to step S10 to decide whether a predetermined period of time has lapsed. If not (answer: NO in step S10) the process proceeds to step S2 for again requesting transmission of the identification information from the portable device 20. This branch is carried out several times as long as the predetermined period of time has not yet lapsed. When the predetermined period of time has lapsed, the process ends and power transfer is stopped by the power transfer device 10.

In summary, the above operation represents a power transfer in one-way, as well as a data communication in one-way. In this case a limited power (minimum power not exceeding the first predetermined value) is used to power-up at least part of the portable device 20, to simultaneously send data from the portable device 20 to the power transfer device 10, and to send data from the power transfer device 10 to the portable device 20 which can to a certain extent provide a necessary data evaluation. Furthermore, the power transferred by the power transfer device 10 after establishment of a minimum data communication with the portable device 20 can be controlled in view of pause and stop thereof by a feedback signal from the portable device 20.

In case of normal operation of the portable device 20, i.e. when the battery power source 21 of the portable device 20 is fully contacted and provides at least a minimum voltage to ensure operation of the portable device 20, the power transfer device 10 (the charging pad thereof) is driven with a full power capability represented by the second predetermined value so that a normal or quick charging of the battery power source 21 of the portable device 20 is possible. This is carried out on the basis of the identification information received by the power transfer device 10 and confirmed according to step S3 in FIG. 3 of the present invention, and in view of the received identification information of the portable device 20 the full power supply, i.e. the full driving of the at least one of first coils 11 in the power transfer device 10 can further be set depending upon the charging properties of the particular portable device 20 according to its identification information. The full power supply may be within the range defined by the first and second predetermined value. If in contrast thereto no identification information or any incomplete data are received which do not allow retrieval of the true identification of the portable device 20 concerned, the power transfer device reduces its power transfer capability to a lower level defined according to the first predetermined value (minimum power) to allow a minimum energy transfer to the portable device to not damage the non-compliant or unknown portable device 20. According to a time condition (step S10 in FIG. 3) the transfer of power to the portable device 20 and the requests for transmitting identification information are stopped after lapse of a predetermined period of time.

When data communication is carried out between both devices there also may be the case that the power transfer device 10 refuses for other reason the charging of a portable device 20 or the portable device (20) refuses to be charged by the power transfer device 10. In These cases power transfer is stopped after corresponding data communication between both devices.

Regarding the data communication described above, the control concept was directed to sending a request by the power transfer device 10 for transmission of an identification information by the portable device 20. The power transfer device 10 is enabled to receive and check the identification information from the portable device 20 (when transferring at least the minimum power to the portable device 20). However, the authentication may be a mutual one wherein the portable device 20 after establishment of the data communication link 32 may request the power transfer device 10 to transmit its own identification information via near field communication NFC to the portable device 20. The second controller 22 of the portable device 20 in a similar manner as it is done in the first controller 12 of the power transfer device 10 carries out a data evaluation to verify the identification information of the power transfer device 10. In case a verification of the identification information of the power transfer device 10 is not possible charging can be refused by the portable device 10 or a switching can be performed to a manual operation mode requiring manual setting by the user.

Hence, both the power transfer device 10 and the portable device 20 can send and receive identification information for data evaluation and may provide a decision after sufficient and successful data exchange whether to permit or refuse a charging operation.

With reference to FIG. 2, the power transfer capability reduction, that is, the setting of the charging power according to the first predetermined value, may be accomplished by reducing the driving current supplied by the first controller 12 to the at least one of first coils 11 of the power transfer device 10 to thereby limit the current in this coil 11, or via any other adequate method.

In this connection, the first controller 12 (and in a similar manner the second controller 22) functions as a power management unit PMU for setting (defining) a power transfer level (strength of magnetic field, intensity of magnetic coupling) for an appropriate power transfer to the portable device 20 depending upon whether an identification information has been received or not, and then depending upon the kind of identification information, when such an information has been received. The NFC circuits 13 and 23 respectively provided in the first and second controllers 12 and 22 represent NFC transceivers, which represent the NFC functionality of both devices and form part of the respective first and second controllers 12 and 22, or are incorporated therein.

Regarding the first and second predetermined values on the basis of which the power transfer intensity (strength, level) is determined and set, these values can manually be set at the time of manufacturing or can be set and/or modified by the user depending upon the nature and the properties of the portable devices 20 used. Specifically, the first predetermined value for defining a lower power transfer level (smaller charging power to be transmitted to the portable device 20) may be provided as a customer setting depending upon information from the manufacturer of the power transfer device 10 and/or the portable device 20 to avoid any deterioration or damage of the portable device 20 and its electronics, but to ensure at least an emergency operation of the portable device with minimum power transferred form the power transfer device 10.

In FIG. 2 the power transfer device 10 is represented by having one coil 11 which can be driven, depending upon the link to be established, by the controller 12. The coil arrangement of the power transfer device 10 is, however, not limited to such a representation wherein only one coil is shown for the purpose of simplification, but the power transfer device 10 can be provided in the form as a pad including at least one of first coils 11 and preferably a plurality of first coils 11 to almost evenly cover the surface of the power transfer device (upon which the portable device 20 is to be placed) to obtain a widespread magnetic field basically parallel to the surface of the power transfer device 10.

When the power transfer device 10 is sized so as to cover plural portable devices at the same time for charging and having a plurality of first coils 11, it is determined in view of the plurality of coils distributed on the charging pad of the power transfer device 10 to identify the position or the particular coil or coils, where a particular portable device 20 is placed on the charging pad, and to identify the kind of portable device 20 located on the charging pad at a predetermined position. In case a particular one of the portable devices 20 placed on the power transfer device 10 is under dead battery condition, this is detected and the coil(s) involved in charging this particular portable device 20 is/are driven to provide the minimum magnetic field intensity according to the first predetermined value to not damage this particular portable device. The other portable devices 20 may be charged according to their own properties in consideration of data peculiar to each particular portable device 20 transmitted to the power transfer device 10 upon request and including the identification information.

In this case, the plural coils 11 of the power transfer device 10, i.e. the plural first coils 11 distributed in the power transfer device 10 are driven individually by the first controller 12 to provide the charging power in an appropriate manner for the portable device 20 concerned.

Regarding the battery dead condition of the battery power source 21 of the portable device 20, the power transfer system and their corresponding control concept thereof according to the present invention is able to cope with this situation, that is, when a breakdown of the power supply of a portable device 20 occurs. The power transfer device 10 is able to transmit via the power transfer link 31 at least a minimum power represented by the first predetermined value to ensure (probably with reduced performance) a data communication between the portable device 20 and the power transfer device 10 based on the near field communication NFC. This also includes the case wherein the portable device is provided in the form of a passive tag without individual power supply, and such a passive tag is powered by the power transfer device via the corresponding magnetic field.

That is, in case the passive tag instead of an active portable device including an individual battery power source, is placed on or located close to the power transfer device 10, power for the operation of the passive tag is received from the power transfer device 10 so that the principal of "powered by the field" generated by the power transfer device 10 is fulfilled. It is in this case appropriate to reduce the field intensity and, thus, the transferred level of charging power to be transferred to the portable device 20 in the form of the passive tag (reduced power according to the first predetermined value), thereby avoiding the danger to damage or deteriorate the portable device 20 in the form of the passive tag which may not stand or absorb a higher level of power transferred to the portable device 20 by the power transfer device 10 via the magnetic field (power transfer link 31).

This operation also represents a power transfer in one-way, as well as a data communication in one-way. In this case the limited power (not exceeding the first predetermined value) is used to power-up at least part of the portable device 20 in the form of the passive tag, to simultaneously send data from the portable device 20 to the power transfer device 10, and to send data from the power transfer device 10 to the portable device 20 which can to a certain extent provide a necessary data evaluation or any predetermined reaction.

Regarding the data transferred from the portable device 20 to the power transfer device 10, such data peculiar to the portable device 20 may include an identification number, an individual production number or any further predetermined data which allow an information about a group of portable devices or an individual portable device, which may be provided in the form of a mobile phone with an NFC functionality. Moreover, an information about the charging conditions of the battery power source 21 of the portable device can be transmitted to the power transfer device 10 to optimize the charging conditions (intensity of the magnetic field generated in the at least one of first coils 11) in view of voltage and current for charging battery power source 21 of the portable device 20. In this connection, the individual portable device 20 may send, on request by the power transfer device 10, data regarding a particular charging condition or may submit data which allow the particular portable device 20 to be assigned to a certain category of charging conditions, probably depending upon the manufacturer, such as for example a first category: charge type 1 W, second category: charge type 2 W (fast charge), and third category: charge type xx W, indicating any further category of power level. These charge category data are provided in the course of a normal operation of the portable device 20 when data communication is performed, and in contrast thereto, the charging power represented by the first predetermined value is below such values in order to surely avoid any damage or deterioration of any unknown or non-compatible portable device 20.

Further identification data may be a brand name, a device type, a serial number and corresponding data. The transmitted information upon establishment of a full data communication link 32 based on near field communication NFC may also include an information about communication ports available for the portable device, for example Bluetooth, IR, USB, and other corresponding communication ports. The transmitted data may further include the battery type as well as coil dimensions which allow a suitable setting of the power transfer device 10 for optimized power transfer to the portable device 20. Such data can be stored in an appropriate storing means in the second controller 22 of the portable device and can be provided according to a standardized format for such stored data so that an easy data evaluation is possible when such data are transmitted via the data communication link 32 based on near field communication NFC.

When according to step S2 in FIG. 3 the transmission of an identification information from the portable device 20 is requested by the power transfer device 10, the data transmitted by the second controller 22 of the portable device 20 to the power transfer device 10 can be evaluated in the first controller 12 in view of plausibility and content. For identification purposes, particular data or values can be compared with prestored corresponding data (stored in the first controller 12) and corresponding values in the power transfer device 10. In case of a data matching obtained, identification can be performed and an authorization for further data transmission or for a subsequent charging process can be determined. This covers the case where the identification information can be recognized as such by the first controller 12 of the power transfer device 10. In case no identification information or an information not suitable for retrieving an identification information is received, the power transfer device 10 switches to a low power operation mode providing the portable device 20 with a lower charging power for operation power in accordance with (and not exceeding) the first predetermined value. In this case, the received information, if any, does not represent an identification information. However, in case it represents an identification information, steps S4 to S6 are performed.

Depending upon a received information peculiar to the portable device 20 the setting of the power transfer device 10 can be performed such that in view of the portable device 20 concerned the charging power (field intensity of the at least one of first coils 11) is set to values in a range from the first predetermined value to a second predetermined value, the second predetermined value being higher than the first predetermined value. Depending upon the prevailing situation and the determination in step S3 of FIG. 3, the intensity of the magnetic field of the at least one of first coils 11 in the power transfer device 10 is controlled, and when no identification information is received (answer NO in step S3), a field intensity corresponding to a driving power not exceeding the first predetermined value (and being lower than the second predetermined value) is set.

In case any identification information is received (data peculiar to the portable device 20 concerned), the control is performed within the range between the first and the second predetermined value, thereby enabling a charging power to be transferred to the portable device 20 which is higher than that limited by the first predetermined value.

The power transfer device 10 is therefore depending upon the prevailing situation able to transfer power to the portable device 20 according to a power level not exceeding the first predetermined value under the above-mentioned detected conditions, and is able to transfer a power according to the second predetermined value higher than the first predetermined value to thereby provide the portable device 20 with a higher power, the level of which can be determined upon receipt of identification data which may also include sufficient information about the structure of the battery and the optimized charging power thereof. In particular, when the lower charging power which does not exceed the first predetermined value is transferred to the portable device 20 by the power transfer device 10, it is ensured that no charging power higher than the first predetermined value is transferred to the portable device 20 unless upon establishing the data communication link 32 based on near field communication NFC a clear identity of the portable device 20 and a corresponding information about the charging power optimal for the particular portable device 20 is received in the course of the further operation. It is then possible to switch over to steps S4 to S6 when eventually an identification information is received.

As described above, the portable device 20, for example provided in the form of a mobile phone or any handheld computer, is usually personalized and individually assigned to a particular user or a group of users. It is in addition to the personalized portable device 20 possible to also personalize the power transfer device in question, that is, to provide an identification information to the power transfer device 10 reflecting an assignment to a particular user or a group of users. This can be achieved by inserting into the power transfer device 10 a detachable secure element (not shown in the drawings), for example provided in the form of an identification card. Such a secure element having an identification information stored therein can be inserted by the particular user to personalize the power transfer device and to allow operation thereof according to the interests of this user. Different users can consecutively insert their own secure element into the power transfer device to obtain exclusive access to this power transfer device.

In case of both devices being personalized any communication with devices not belonging to personalized devices can be recognized and charging or any further data communication can be refused or blocked. The users are notified of this condition by displaying a corresponding message on any display means available.

In the description above the portable device 20 the battery power source 21 of which requires charging or the passive portable device 20 (such as a temporarily unpowered portable device 20 or a passive tag) is placed close to or preferably on the power transfer device 10 to establish the data communication link 32 and the power transfer link 31, resulting in data communication between both devices and power transfer from the power transfer device 10 to the portable device 20 (two-way data communication and one-way power transfer as mentioned above).

Figure 4:
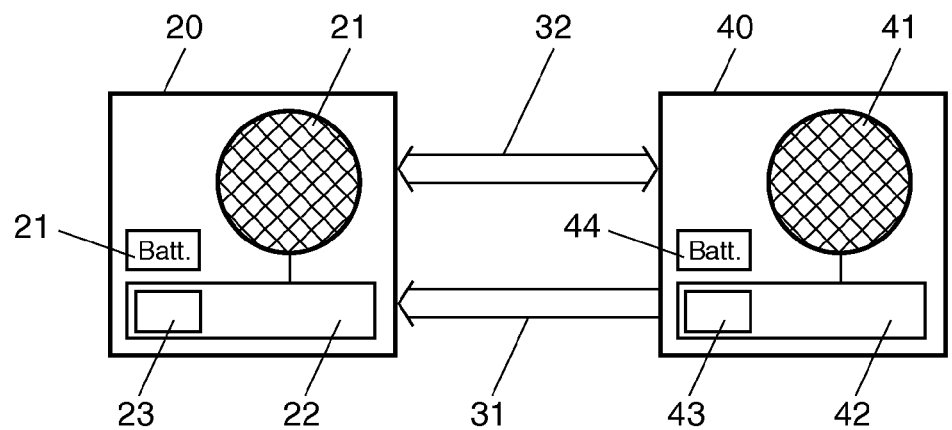
FIG. 4 shows the arrangement of a data communication link and a power transfer link between two portable devices.

However, according to another aspect of the present invention, in addition to the two-way data communication also a two-way power transfer is possible. While the above description refers to a specific charging pad as the power transfer device 10, power can be transferred from any portable device 20 which has a fully charge battery power source 21. A corresponding structure of the present invention is shown in FIG. 4. In this case one portable device 20 (having a fully or suitable charged battery power source 21) is able to charge another portable device 40 the battery power source 44 of which is totally exhausted. Hence, besides the technology of having the interaction between a charging pad (power transfer device 10) and a portable device 20 (mobile unit), it is possible according to the present aspect of the invention to enable data communication in the above described manner between two portable devices 20 and 40 and a subsequent charging of the exhausted battery power source 44 of the portable device 40 in question. That is, one of the portable devices (reference sign 20 in FIG. 4; having the fully or suitably charged battery power source 21) functions as a charging pad (power transfer device 10) for the other portable device 40, involving the performance of the data communication link 32 as well as the power transfer link 31 between both devices 20 and 40 in cooperation. The further portable device 40 comprises in a similar manner a controller 42 including an NFC circuit 43 and a further coil 41.

For example, a digital still camera including a fully charged battery power source may charge wirelessly a mobile phone (cellular phone) in case of emergency, that is, when the battery power source of the mobile phone is more or less exhausted and cannot ensure a proper telephone communication when needed by the user. Or a mobile phone with fully charge battery power source may charge in a wireless manner another mobile phone (with empty or exhausted battery power source) to enable communication.

Based on the data communication link 32 and the power transfer link 31 and the corresponding data flow and power flow the power transfer device or a suitable portable device (such as device 20 in FIG. 4) may power-up another portable device (40 in FIG. 4; having an exhausted battery power source) and data can be retrieved from the latter via near field communication NFC.

Both portable devices 20 and 40 involved in the two-way data communication and the power-up concept as described above require NFC functionality to be able to establish the necessary data communication link 32. Both devices must have included additional or incorporated in a central controller (such as 22 and 42 in FIG. 4) the respective NFC circuit (23 and 43 in FIG. 4) and the corresponding coils (21 and 41 in FIG. 4) for generation of the magnetic fields to obtain the inductive coupling. An arrangement of both portable devices 20 and 40 concerned close to each other is necessary for the inductive coupling and a correct operation of the near field communication NFC and power transfer.

Since both portable devices 20 and 40 are personalized the data communication between these devices may constitute of both devices sending their individual identification information to the respective other device in a similar manner as it is the case when both the power transfer device 10 and any portable device 20 are both personalized.

Figure 5:
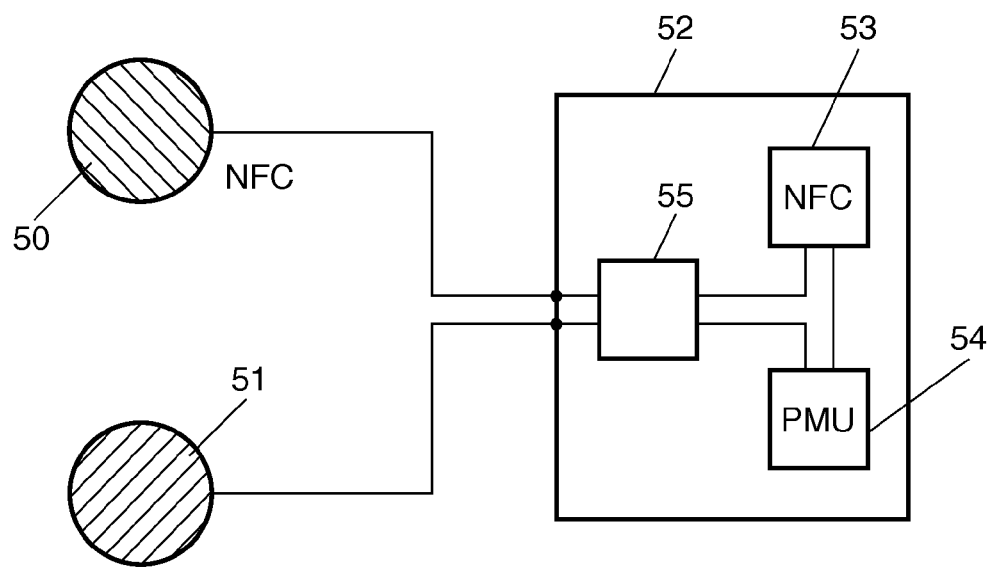
FIG. 5 shows the structure of driving a coil arrangement for magnetic coupling.

FIG. 5 shows the structure of driving a coil arrangement for magnetic coupling. Specifically, in FIG. 2 the arrangement of coils in the power transfer device 10 and the portable device 20 includes only one coil 11 and 21, respectively, for a simplified illustration. The power transfer device 10, however, may have plural coils, that is plural first coils distributed on the power transfer device 10. The coils may be adapted for both data communication and power transfer depending upon the driving of the plurality of the first coils 11, or there may be separate coils for the data communication link 32 and the power transfer link 31.

FIG. 5 shows the latter case, wherein a controller 52 is considered, which may be arranged in a portable device 20 or 40 (FIG. 4) or in a power transfer device 10. The controller 52 includes an NFC circuit 53 for driving an NFC coil 50 to establish the data communication link 32 via near field communication NFC (representing the NFC functionality). Further, a power management unit PMU 54 is included in the controller 52 to drive a power transfer coil 51 connected to the controller 52 to establish the power transfer link 31. Depending upon the link to be established, a selection circuit 55 selects the suitable coil out of the NFC coil 50 and the power transfer coil 51. These coils can be operated separately, intermittently or at the same time. The coils therefore serve for providing the magnetic (inductive) coupling between devices and also function as an antenna.

The selection of the coils can be implemented in various ways: (i) in a time interleaved manner, wherein a switch is used to select one of both coils; (ii) based on frequency domain separation, wherein passive filtering is used to separate the power transfer from data transmission; (iii) based on a combination of both processes mentioned under (i) and (ii). The ways to implement selection are not limited to the examples as mentioned above.

The present invention can therefore combine the wireless electromagnetic power transfer and electro magnetic data communication both in one-way and two-way operation modes.

It is further to be noted that the description of the power transfer system and the control method thereof according to the present invention has been illustrated and described in detail in the drawings and the description above, but the illustration and description are considered to be illustrative or exemplary and are not restrictive. By contrast, the invention is not limited to the disclosed embodiments described above but can be varied within the scope of the appended claims.

Moreover, the method steps do not exclude other elements or steps covered by the scope of the appended claims and may be changed in their sequence without departing from the present invention. Furthermore, reference signs are not to be construed as limiting a scope of the claims and the specification.

Various modifications may be considered by those skilled in the art which follow the principles of the present invention and which are considered to be covered by the scope of the appended claims.

In summary the present invention, thus, relates to a power transfer system which comprises a power transfer device 10 as well as at least one portable device 20, and to a method of controlling the power transfer system specifically in case of a dead battery condition of a battery 21 of the portable device 20. The power transfer device 10 for wireless charging of a battery 21 arranged in the portable device 20 and the power transfer device 10 each comprise a near field communication functionality for data communication by a data communication link 32 between the devices. The method includes a step of starting to establish the data communication link 32 between the power transfer device 10 and the portable device 20. When the establishment of the data communication link 32 is started, the power transfer device 10 requests the portable device 20 to transmit an identification information via the data communication link 32 to the power transfer device 10. It is then detected whether the identification information of the portable device 20 is received by the power transfer device 10. Depending upon whether the identification information is received a setting is performed for setting a charging power to be transferred from the power transfer device 10 to the portable device 20. The setting provides a reduced charging power not exceeding a first predetermined value when the identification information is not received. Depending upon this setting a power transfer link 31 is established by the power transfer device 10, and the charging power not exceeding the first predetermined value is transferred to the portable device 20 so that the portable device 20 can be powered by this transferred power to enable data communication and to charge the battery 21.

The invention claimed is:

1. Method of controlling a power transfer system for wireless charging of a battery power source of a portable device by a power transfer device, each of the portable device and the power transfer device having a near field communication functionality for data communication by a communication link between said power transfer device and said portable device, the method comprising:
starting to establish the data communication link between said power transfer device and said portable device,
requesting by said power transfer device said portable device to transmit identification information via said data communication link to said power transfer device,
detecting whether said identification information of said portable device is received by said power device or not,
setting a charging power to be transferred to said portable device, said charging power not exceeding a first predetermined value when said identification information is not received by said power transfer device, and
establishing a power transfer link by said power transfer device and transferring said charging power not exceeding said first predetermined value to said portable device.

2. Method according to claim 1, wherein said starting step includes starting establishment of said data communication link on the basis of a near field communication.

3. Method according to claim 1, wherein said detecting step includes the step of judging whether any data are received from said portable device via said data communication link and whether any information received represents an identification information of said portable device.

4. Method according to claim 1, wherein said setting step includes the step of setting said charging power to a value in a range from said first predetermined value to a second predetermined value which is higher than said first predetermined value, when said detection step results in said identification information being received.

5. Method according to claim 1, wherein said establishing step includes generating a magnetic field by at least one coil in said power transfer device according to an intensity corresponding to the driving power not exceeding said first predetermined value, when said identification information is not received, and according to an intensity corresponding to a range from said first predetermined value to a second predetermined value higher as the first predetermined value, when said identification information is received.

6. Power transfer system, comprising a power transfer device and at least one portable device, for wireless charging of a battery power source of said portable device, each of said portable device and said power transfer device having a near field communication functionality for data communication by a data communication link between said power transfer device and said portable device, the system further comprising:
a first controller for establishing said data communication link between said power transfer device and said portable device, and for requesting said portable device to transmit an identification information via said data communication link to said power transfer device, the first controller further having a detecting means for detecting, whether said identification information is received from said portable device, and setting means for setting a charging power to be transferred to said portable device, said charging power not exceeding a first predetermined value, when said identification information is not received, and
establishing means for establishing a power transfer link and transferring said charging power not exceeding said first predetermined value to said portable device.

7. Power transfer system according to claim 6, wherein said establishing means includes at least one of first coils connected to said first controller of said power transfer device as well as a second controller connected to a second coil of said portable device to generate a magnetic field to establish one of said data communication link and said power transfer link between said power transfer device and said portable device.

8. Power transfer system according to claim 6, wherein said first controller comprises a first NFC circuit, and said second controller comprises a second NFC circuit, for establishing said data communication link between said power transfer device and said portable device based on near field communication.

9. Power transfer system according to claim 6, wherein said power transfer device is a further portable device.

10. Power transfer system according to claim 6, wherein each of said power transfer device and said portable device comprises a plurality of magnetic coils to establish said power transfer link and said data communication link, and a selection circuit for selecting at least one of said magnetic coils.

* * * * *